(12) United States Patent
Lundquist et al.

(10) Patent No.: US 6,408,017 B1
(45) Date of Patent: Jun. 18, 2002

(54) HIGH SPEED DEMUX PARALLEL CORRELATOR SYSTEM

(75) Inventors: Alan Earl Lundquist, Salt Lake City; John Walter Zscheile, Jr., West-Farmington; Samuel Charles Kingston, Salt Lake City, all of UT (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 08/170,603

(22) Filed: Dec. 21, 1993

(51) Int. Cl.[7] ................................................. H04K 1/00
(52) U.S. Cl. ...................... 375/150; 375/130; 375/140; 375/147
(58) Field of Search ............................. 375/1, 200–210, 375/130–153; 380/34

(56) References Cited

U.S. PATENT DOCUMENTS

| | | | | |
|---|---|---|---|---|
| 4,550,414 A | * | 10/1985 | Guinon et al. ................. | 375/1 |
| 4,621,365 A | * | 11/1986 | Chiu ............................... | 375/1 |
| 5,022,047 A | * | 6/1991 | Dixon et al. .................... | 375/1 |
| 5,276,705 A | * | 1/1994 | Higgins ........................... | 375/1 |

* cited by examiner

Primary Examiner—Bernarr E. Gregory
(74) Attorney, Agent, or Firm—John B. Sowell; Mark T. Starr

(57) ABSTRACT

In a high speed, high processing gain PN spread spectrum acquisition system an analog signal comprising a high speed PN code is received and converted to a high speed digital format. A demuxer is employed to divided the high speed digital signal into lower speed multiplexed portions. The lower speed multiplexed portions of the digital signal are processed in a plurality of parallel channels which employ correlators coupled to coherent accumulators and non-coherent accumulators coupled to the output of the coherent accumulators to provide a signal having sufficient energy to permit detection of one of a plurality of partial PN replica codes as the one code which is synchronized with the received analog signal comprising a high speed PN code and to synchronize with the PN replica code generator.

14 Claims, 5 Drawing Sheets

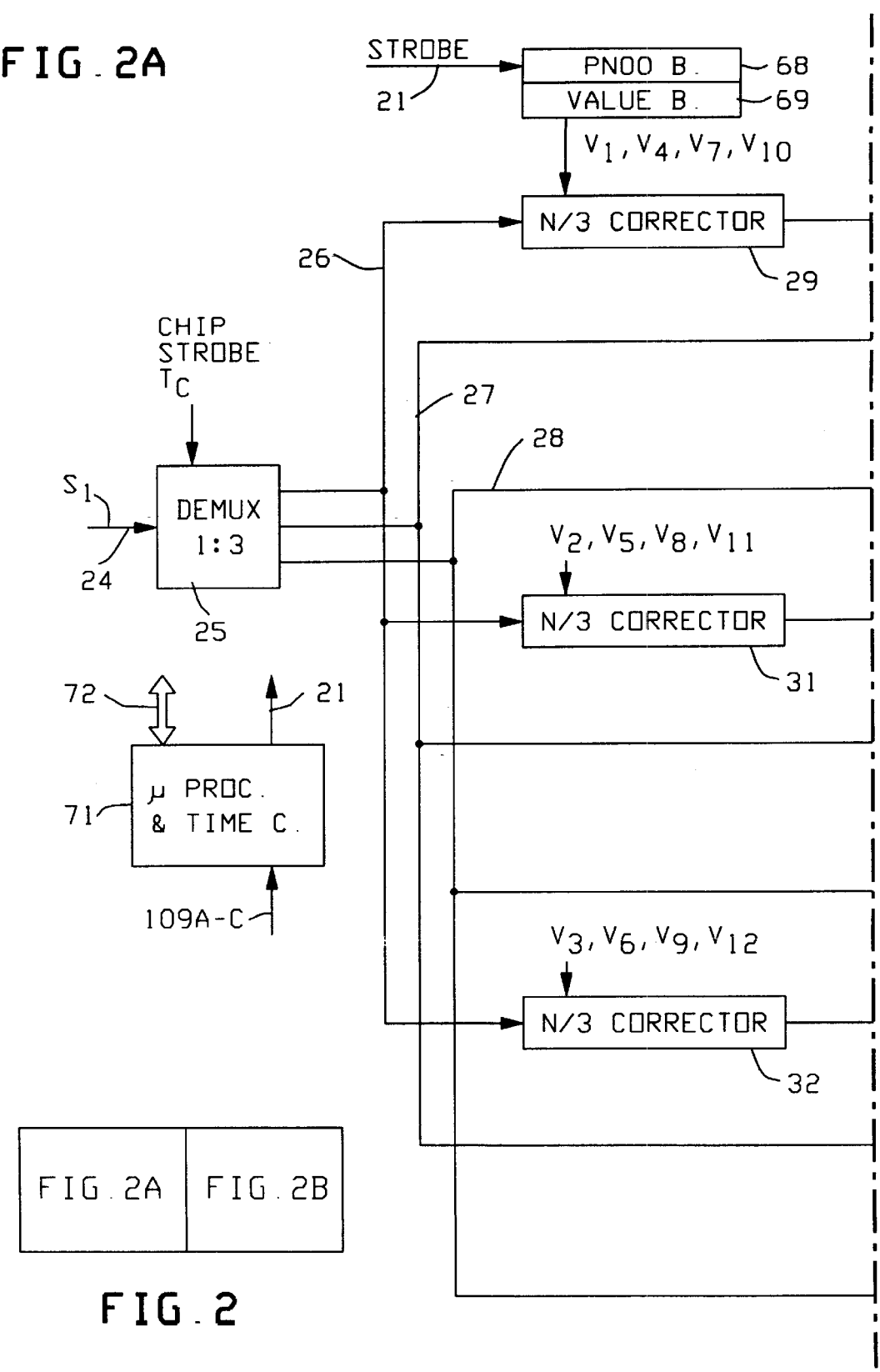

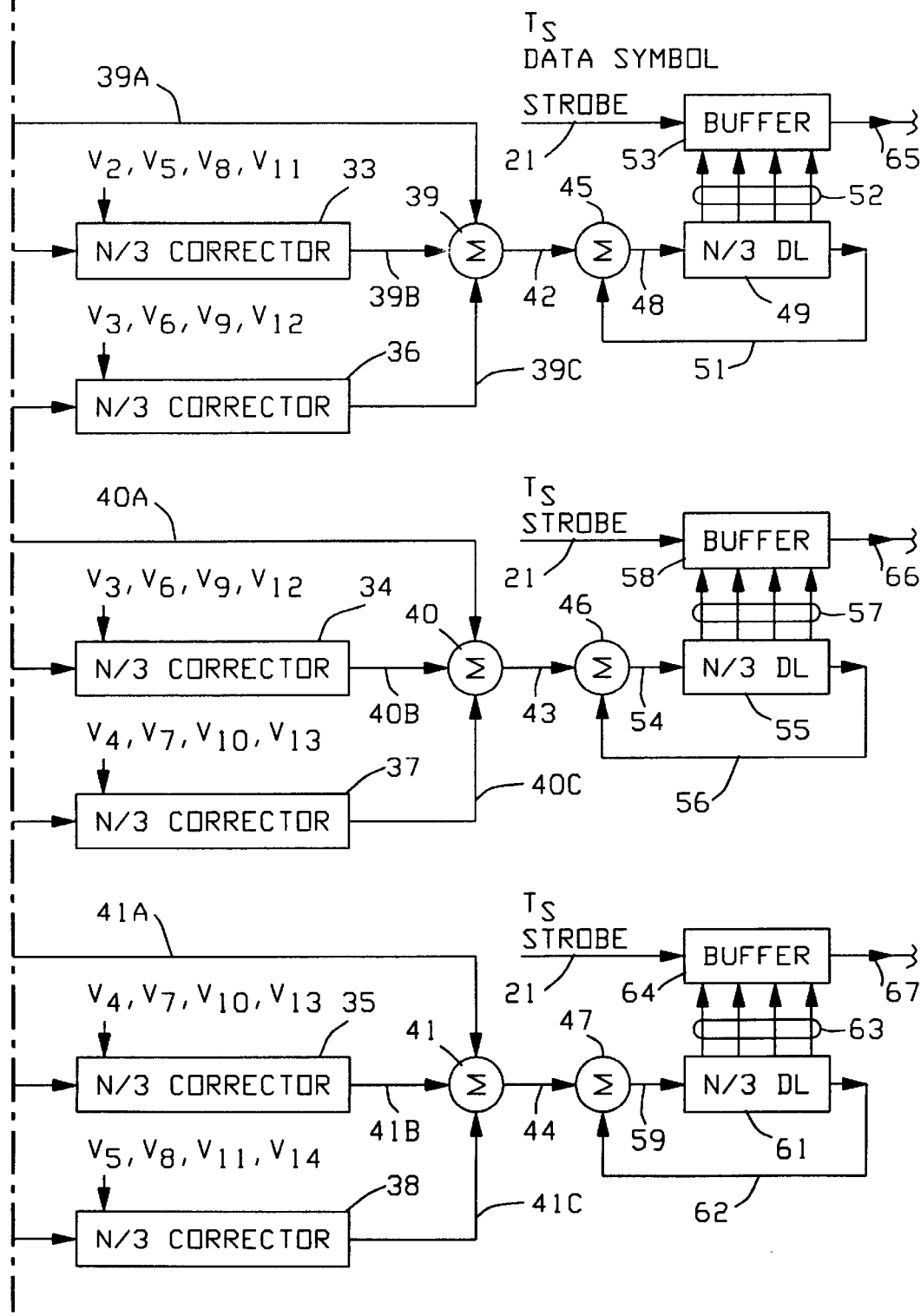

HIGH SPEED DEMUX PARALLEL CORRELATOR SYSTEM

RELATED APPLICATIONS

This invention relates to application Ser. No. 08/170,604, filed Dec. 21, 1993 for an Asynchronous Sample Data Demodulation System, now U.S. Pat. No. 5,414,730.

BACKGROUND OF THE INVENTION

1. Field of the Invention

The present invention relates to high speed, high processing gain, PN spread spectrum acquisition systems. More particularly, the present invention relates to a novel parallel correlator used for acquisition to increase the search speed of acquisition by effectively slowing the novel parallel correlator speed down to a fraction of the speed of the other acquisition circuitry.

2. Description of the Prior Art

In our co-ending U.S. application Ser. No. 08/170,604 filed Dec. 21, 1993 concurrent herewith, now U.S. Pat. No. 5,414,730, there is shown and described an Asynchronous Sample Data Demodulation System having a novel correlator used for parallel despreading a received PN coded signal. This novel correlator despreaded all of the PN coded signals in a burst of information and stores soft decisions used to demodulate and track the received signal.

The correlator in this co-pending application was found to be limited by a speed no greater than about one-third the operational speed of the analog receiver and its associated analog to digital converter.

If the operational speed of the converter of the co-pending application system could be increased by a factor of three to five times without an appreciable cost and complexity, then the processing gain of the system could be increased directly proportionally to the factor of the speed increase of the correlator. Thus, it is highly desirable to provide a high performance acquisition system which includes a novel correlator whose effective speed of operation can be increased by an integer or factor greater than two.

SUMMARY OF THE INVENTION

It is a primary object of the present invention to provide a novel acquisition system for PN coded signals.

It is a primary object of the present invention to provide a high speed novel acquisition system for use in acquiring burst signals or continuous signals with or without a preamble or header.

It is a primary object of the present invention to provide a novel correlator which comprises a plurality of identical parallel correlators arranged to correlate specific portions of an N chip signal which portions together span a contiguous the N chip signal.

It is a primary object of the present invention to provide apparatus for demuxing received PN coded signal and demuxing the replica PN coded signal to provide a plurality of PN replica codes that are synchronized with each other.

It is a primary object of the present invention to provide a plurality of parallel correlators each operating at a fraction of the PN code chip rate whose outputs are summed to provide an effective output at the desired PN code chip rate.

According to these and other objects of the present invention, there is provided an apparatus for receiving and acquiring a high performance, high speed PN coded signal having a front end receiver for converting received analog signals into a digital format and for demuxing the received digital signals. The output of the demuxed digital signals are coupled to a plurality of correlators, each of which is provided with a demuxed replica PN code value synchronized with the received demuxed PN coded signals. The sum of sets of correlators are coherently accumulated over a data symbol duration and further these signals are noncoherently accumulated over a plurality of data symbol times to achieve a high enough signal to noise ratio to achieve detection of lock on of the PN replica coded signal to the received signal.

BRIEF DESCRIPTION OF THE DRAWINGS

FIGS. 2, 2A, and 2B are a schematic block diagram showing a received demuxed PN coded signal being distributed to a novel composite parallel correlator;

DETAILED DESCRIPTION OF THE PREFERRED EMBODIMENT

Figure 1:
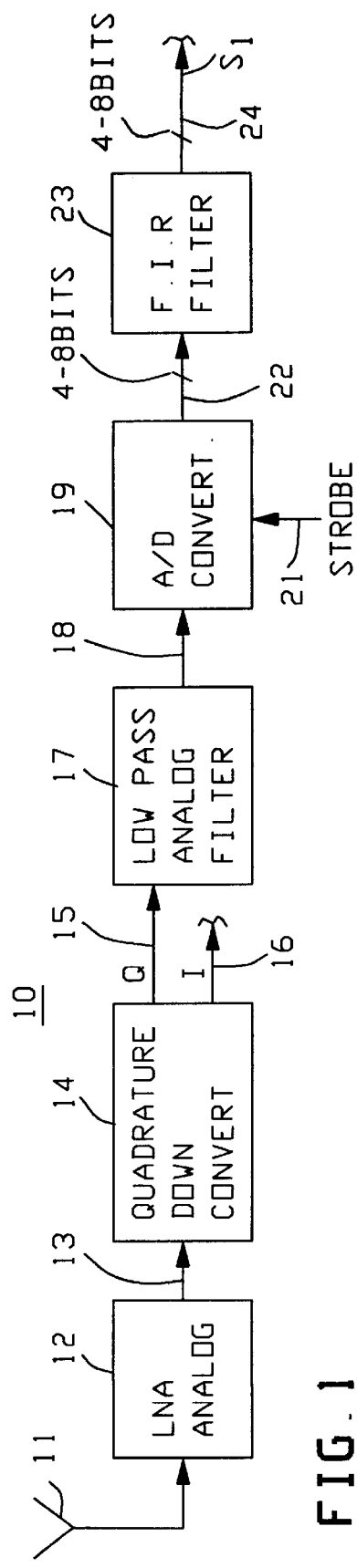
FIG. 1 is a schematic block diagram of a preferred front end receiver.

Refer now to FIG. 1 which is a schematic block diagram of a preferred front end receiver 10 shown having an antenna 11 coupled to a low noise amplifier 12. The output of the low noise amplifier on line 13 is coupled to a quadrature down converter 14. The output of the quadrature down converter 14 is shown having a real (Q) output on line 15 coupled to a low pass analog filter 17. The imaginary (I) output on line 16 is shown broken and it will be understood that the imaginary signal from the down converter 14 will be processed the same as the real (Q) output 15 to be described in greater detail hereinafter.

The output of the low pass analog filter 17 on line 18 is applied as a serial input to an analog to digital converter 19 to produce a parallel 4 to 8 bit digital output on line 22 which is coupled to a finite impulse response (FIR) filter 23. The output of the FIR filter on line 24 is shown as the S1 signal. The analog to digital converter is shown having a strobe input 21 which is generated at the micro-processor control to be described in greater detail hereinafter. The digital output on line 24 is operating at a very high chip rate. Present systems are capable of several giga hertz which is substantially higher than the correlators which will be described hereinafter.

Refer now to FIG. 2 showing line 24 from FIG. 1 applied as in input to the demultiplexer commonly known as a demuxer 25. For purposes of this invention a simple one to three demuxer is shown even though the demuxer could be of a higher or lower order of demuxing. The received signal on line 24 comprises a plurality of chips in digital and serial format which are demuxed at the prevailing chip rate to provide every third chip of the incoming signal on lines 26, 27 and 28. Line 26 is shown connected as an input to the correlators 29, 31 and 32 which receive the identical series of demuxed chips. In similar manner, line 27 is shown connected to correlators 33, 34 and 35, thus, they receive a different series of demuxed chips which are separated from the series of demuxed chips on line 26 by one chip. In similar manner, line 28 is shown connected to correlators 36, 37 and 38 which receive a separate and different series of demuxed chips which are separated from the chips on line 27 by one chip.

The correlators 29, 33 and 36 provide a set of correlators which are coupled to summing circuit 39 having inputs 39A to 39C. Each of the correlators 29, 33 and 36 has a distinct and unique PN input and also has a distinct and different unique value input which produces a unique value on each of the output lines 39A, 39B and 39C. When these unique values are summed, the output on line 42 is applied to a second summing circuit 45 whose output on line 48 is applied to a delay line 49 having only one-third of the normal delay taps. The output of delay line 49 on line 51 is applied as an input to the summing circuit 45 to provide a feedback signal for coherent accumulation over a data symbol time. At each data symbol time $T_s$, a strobe signal on line 21 is applied to buffer 53 to load the information accumulated in delay line 49 into buffer 53 via parallel input lines 52. The operation of the second set of correlators shown having inputs 40A to 40C applied to a first summing circuit 40 and having an output line 43 applied as an input to a second summing circuit 46 operate in the same manner as the summing circuits 39 and 45 and do not require additional explanation. In similar manner, the output on line 54 to delay line 55 has an output feedback line 56 and parallel output lines 57 applied to buffer 58 to operate in the same manner as the delay line 49 and buffer 53 described hereinbefore and does not require additional explanation. Similarly the elements 59 through 64 operate in the same manner as those described hereinbefore and do not require additional explanation. However, the outputs on line 65, 66 and 67 represent coherent accumulation of signals that are separate and distinct from each other and will be processed separately as will be described hereinafter.

Buffer 68 contains a replica code which has a length N/3. In the preferred embodiment of the present invention, it is only practical to make correlators having 100 to 500 taps, thus the length of the buffer register 68 is one-third of 100 to 500 or 35 to 165 taps long. Since the replica code in buffer 68 is changing, it is necessary to parallel load the replica code into a second buffer 69 so that each of the chip values shown as V1, V4, V7 to V10 can be simultaneously applied as inputs to the correlator 29 as will be explained in greater detail hereinafter. Since each of the nine correlators shown in FIG. 2 have similar replica buffers like buffer 68 and buffer 69, only the outputs from the value buffers are shown applied to the other eight correlators variously numbered 31 through 38. None of the sets of values from the value buffers which apply to any set of three buffers is identical. However, it will be noted that the value numbers applied to buffer 33 are identical to those being applied to correlator 31. A microprocessor and timing control block 71 is shown having strobe signal output lines 21 which are applied to the replica buffer register 68, etc. It will be understood that since the information being generated in these buffer registers is separated in time one from another that the strobe 21 occurs at the proper time once the information is loaded into the buffer registers. Thus, the strobes on line 21 may be the same or different in order to make the system operable as will be noted in the explanation which follows.

Processor 71 is also shown having a command and information bus 72 connected to demuxer 25. This bus is also connected to other elements in FIG. 2 which require control in the system as will be noted hereinafter.

Having explained the structure shown in FIG. 2 it will be recognized that the demuxer 25 is operable at the high chip rate of the input data stream. However, the nine correlators coupled to one of the three demuxer output lines 26 to 28 are operable at one-third the high chip rate. The number of branches is selected to reduce the correlators to an operable speed between 300 and 600 mega hertz. While the length of the buffer registers has been explained as having N values and only twelve have been shown the value of N may be much greater and is as long as the number of chips in the window of uncertainty to be searched. The coherent accumulators which include delay lines 49, 55 and 61 are being operated at one-third the high chip rate at the input, but are being strobed to produce an output at a data symbol time $T_s$ which may include thousands of chip times $T_s$.

Figure 3:
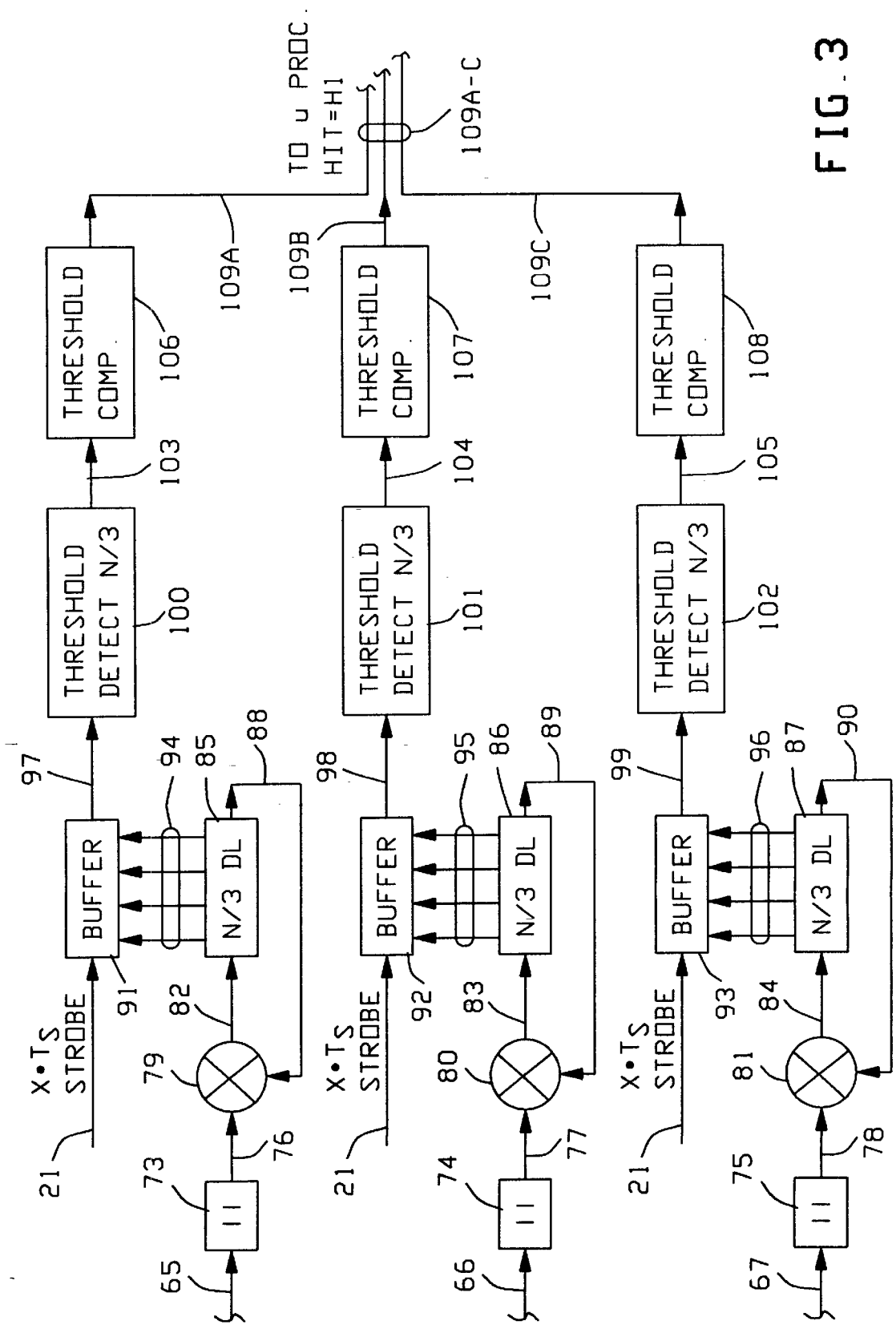
FIG. 3 is a schematic block diagram showing the novel noncoherent accumulators which are coupled to the output of the coherent accumulator shown on FIG. 2.

Refer now to FIG. 3 showing a schematic block diagram of the novel noncoherent accumulators which are coupled to the outputs from the coherent accumulators shown in FIG. 2. Lines 65, 66, and 67 are coupled as inputs to absolute value detectors 73, 74 and 75 respectively. The outputs of these absolute value detectors on lines 76, 77 and 78 are shown being applied to summing circuits 79 through 81. The output of the summing circuit 79 to 81 is shown being applied to output lines 82 to 84. The output lines 82 to 84 are shown coupled as inputs to the N/3 delay lines 85 to 87 each of which is provided with an output line 88 to 90 that is fed back to the respective summing circuit 79 through 81 to provide a noncoherent accumulation of data in the delay lines over a duration of a plurality of data symbol times. The accumulated data in delay lines 85 to 87 is loaded into the associated buffers 91 to 93 via parallel input lines 94 to 96 to provide noncoherent outputs on lines 97 to 99. The noncoherent information on lines 97 to 99 is applied as an input to the threshold detection circuits 100 to 102. The output of the threshold detection circuits on lines 103 to 105 is applied to logic circuits 106 to 108 which identify the PN replica code which obtained the hit correlation. The output of the hit identification code logic blocks 106 to 108 on lines 109A to 109C are applied or coupled to the microprocessor and timing control circuits 71 described hereinbefore so that acquisition of the identified PN code may be used to synchronize the PN replica code generator in the receiver (not shown).

Having explained the structure shown in FIG. 3 it will be recognized that the signals on lines 65 to 67 have been strobed in data symbol time $T_s$ and non-coherent accumulation occurs in delay lines 85 to 87 in $T_s$ time. However, the output of information from buffers 91 to 93 on lines 97 to 99 occurs at a plurality of $T_s$ times shown as $X \cdot T_s$ on strobe lines 21 which is X times slower that $T_s$ and selected to assure threshold detection at detectors 100 to 102.

Figure 4:
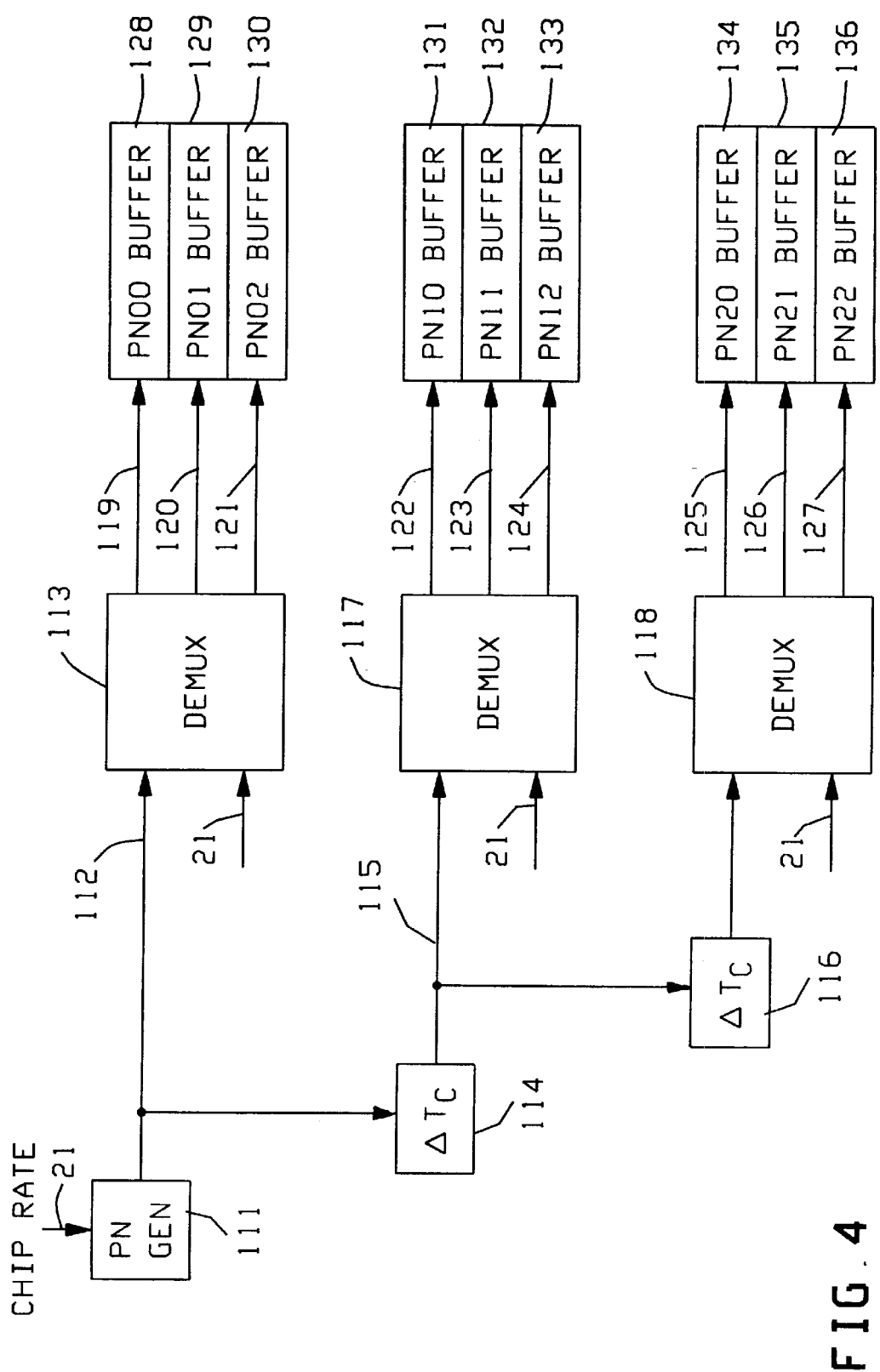
FIG. 4 is a more detailed schematic block diagram showing a novel replica PN code generator for generating a plurality of demuxed and delayed synchronized replica codes.

Refer now to FIG. 4 showing a more detailed schematic block diagram of a novel replica PN code generator for generating a plurality of demuxed and delayed synchronized replica codes. Each of the individual codes being generated in FIG. 4 is separated in time from the other PN codes, thus are unique. The master replica PN generator 111 is shown having a chip rate input 21 and a bus 72 coupled to the microprocessor 71 (not shown). The output of the PN generator 111 on line 112 is directly coupled to a first demux circuit 113 and to a first chip delay 114. The output of the first chip delay circuit 114 on line 115 is coupled to a second chip delay circuit 116 and to a second demux circuit 117. The output of the second chip delay circuit 116 is shown coupled to a third demux circuit 118. Each of the demux circuits 113, 117 and 118 is shown having a chip rate or timing strobe 21 input from the microprocessor 71. The outputs from the three demux circuits are shown on lines 119 to 127 being coupled to a set of replica code buffer circuits 128 to 136, respectively. It will be understood that the buffer 128 is the same replica code buffer 68 shown in FIG. 2 and that the replica code buffers shown as PNO1 to PN22 on buffers 129 to 136 are buffers that are associated with the other eight correlators of FIG. 2.

Stated differently, the individual and unique replica codes are loaded into the replica code buffers 128 to 136. The contents from the replica code buffers 128 to 136 are loaded into a value buffer 69 etc. (not shown) associated with each of the nine correlators shown in FIG. 2. Instead of showing the value buffers and their replica code buffers, the outputs from the value buffers are shown being applied to the nine correlators 29, 31 to 38 for a better understanding of the present invention.

Figure 5:
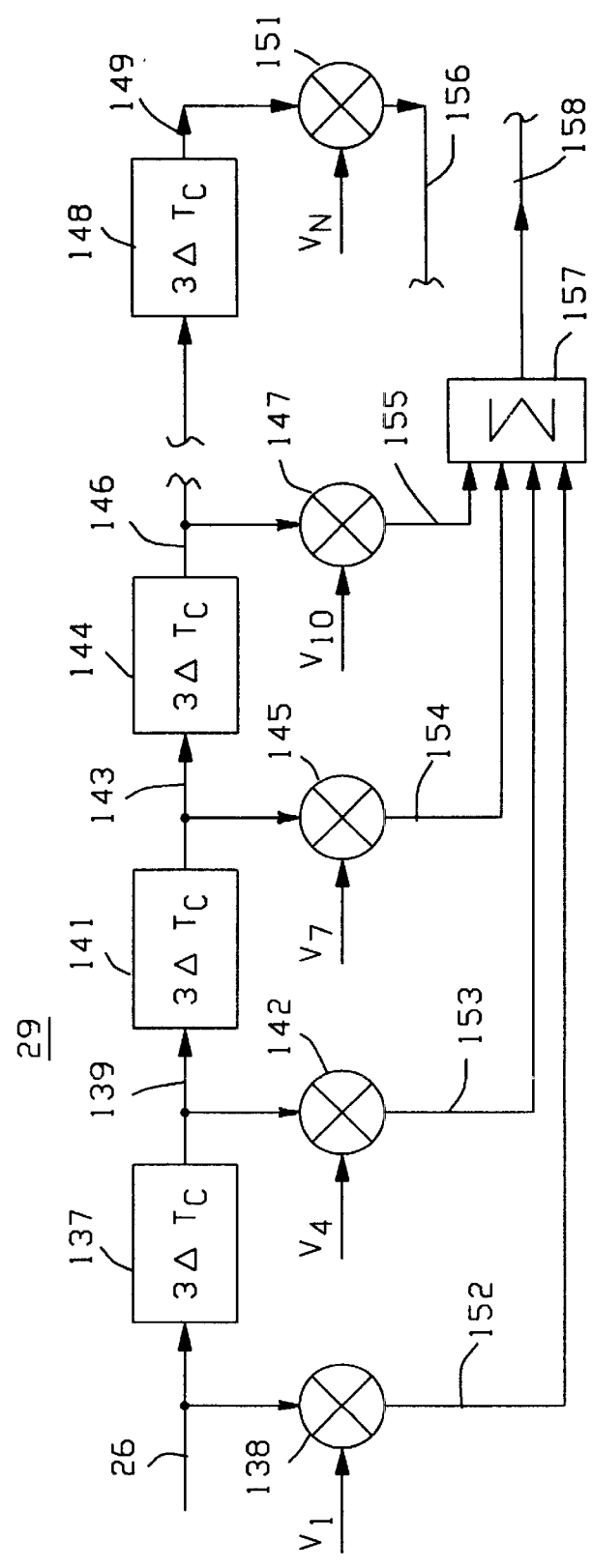
FIG. 5 is a more detailed schematic block diagram of one of the plurality of preferred embodiment correlator shown in FIG. 2.

Refer now to FIG. 5 showing a detailed schematic block diagram of one of the plurality of nine preferred embodiment correlators shown in FIG. 2. It will be understood that each of the nine correlators shown in FIG. 2 will have a circuit similar to the circuit 29 shown in FIG. 5 and that the explanation that follows for the detailed correlator relates only to correlator 29 which has an input line 26 coupled to a first delay circuit 137 and to a multiplier 138. Delay 137 accomplishes a delay of three chip times shown as $T_c$. The output from the first delay 137 on line 139 is applied to a second delay circuit 141 and to a second multiplier 142. The output of the second delay circuit on line 143 is shown being applied to a third delay circuit 144 and to a third multiplier 145. The output of the third delay circuit 144 on line 146 is shown discontinuous and connected to a fourth multiplier 147. If there are other tap delay lines, the last delay line is shown as a delay circuit 148 having an output 149 connected to a last multiplier 151. Each of the multipliers 138, 142, 145 and 147 is shown having a value input having the same value as the inputs shown to correlator 29 in FIG. 2. The outputs of the multipliers shown in FIG. 5 on lines 152 to 156 are applied to a summing circuit 157 to produce a summed output on line 158 which is the same as the output on line 39A shown in FIG. 2.

It will be understood that the FIG. 5 correlator is explained using only five taps and four delays. However, in practice a large number of taps and delays are used to achieve improved high acquisition speeds.

Having explained a preferred embodiment of the present invention high speed demuxed parallel correlator system, it will be appreciated that the present system is capable of acquiring either a burst or continuous transmission of a PN spread spectrum code with or without a leader or header.

It will be appreciated that in FIG. 2 the demuxer 25 has a ratio of three to one, thus three raised to the second power results in nine correlators being shown in FIG. 2. Had the demuxer 25 had a ratio of 1 to 4, 4 raised to a power of 2 would have resulted in 16 correlators in FIG. 2. Neither of the values has anything to do with the value N illustrating the largest number of taps employed. In the illustration shown in FIG. 5, the number of taps being applied to the summing circuit 157 is consistent with the correlators shown in FIG. 2 and has an added tap $V_n$ having an output 156 also applied to the summing circuit 157 to illustrate that any number N may be employed as the number of taps for a high speed correlator. The greater the number of taps N employed in a high speed correlator of the type shown in FIG. 2, the shorter the acquisition time.

What is claimed is:

1. A high speed acquisition apparatus having a high processing gain, comprising:

demuxing means (25) having an input port coupled to a source of high speed signals modulated by a high speed PN code, said demuxing means (25) having a plurality of P active output ports each comprising a unique lower speed part-of the high speed PN code signals thereon, a plurality of correlators (29 etc) comprising $P^2$ in number arranged in P parallel channels, each channel having P correlators and each correlator having output ports and individual input ports connected to a separate one of said P active output ports of said demuxing means, a PN generator (111) having an output port for generating a high speed PN replica code, PN replica code demuxing means (113 etc) coupled to the output port of said PN generator for generating a plurality P of unique lower speed partial replica codes at individual outputs.

each of said individual outputs of said PN code demuxing means being coupled to a second input of said $P^2$ correlators, means for detecting (FIG. 3) which of the lower speed unique replica codes are synchronized with the high speed PN code signals and for generating hit detection signals, processor means (71) coupled to the output of said means for detecting (FIG. 3) the unique lower speed partial replica codes from said PN generator and to said plurality of $P^2$ correlators (29 etc) for acquiring said high speed PN code signals as a pluarality of lower speed codes.

2. A high speed acquisition apparatus as set-forth in claim 1 wherein said means for detecting comprises summing means coupled to the output ports of said $P^2$ correlators in said P parallel channels.

3. A high speed acquisition apparatus as set forth in claim 2 wherein said summing means comprises a plurality P of summing circuits, said summing circuits each one for each channel having a plurality of P input ports, one for each correlator in each of said channels.

4. A high speed acquisition apparatus as set forth in claim 3 wherein said means for detecting comprises a coherent accumulator coupled to the ouput ports of each of said summing circuits.

5. A high speed acquisition apparatus as set forth in claim 4 wherein each coherent accumulator comprises a delay line connected in parallel to an output buffer enabled each data symbol time $T_s$.

6. A high speed acquisition apparatus as set forth in claim 5 wherein said means for detecting comprises a non-coherent accumulator coupled to the output of each output buffer of each coherent accumulator, said non-coherent accumulator having a delay line coupled to a second output buffer, enabled at a fixed plurality of data symbol times $T_s$.

7. A high speed acquisition apparatus as set forth in claim 6 wherein saidlmeans for,detecting comprises a threshold detector coupled to the output of each second output buffer.

8. A high speed acquisition apparatus as set forth in claim 7 wherein said means for detecting comprises a hit detector coupled to each threshold detector for identifying the unique replica code in synchronization with said high speed PN code.

9. A high speed acquisition apparatus as set forth in claim 4 wherein said coherent accumulator receives information at a chip rate $T_c$ divided by P and outputs information at a data rate equal to $T_s$ where $T_s$ is a time much larger than $T_c$.

10. A high speed acquisition apparatus a set forth in claim 6 wherein said non-coherent accumulator outputs information at a data rate equal to x times $T_s$ where x is an integer larger than one.

11. A high speed acquisition apparatus as set forth in claim 1 wherein said high speed PN code signals are operating at a chip rate $T_c$ and said plurality of correlators are each departing at the $T_c$ chip rate divided by P.

12. A high speed acquisition apparatus as set forth in claim 1 wherein said correlators each comprise a plurality of delay circuits connected in a series chain and having an original input coupled to an output from said demuxing means.

13. A high speed acquisition system as set forth in claim 12 wherein said correlators each comprise a plurality of multipliers each being connected to an output of one of said delay circuits, and the output of said multipliers being connected to a summing circuit having an output connected to said summing means.

14. A high speed acquisition system as set forth in claim 1 wherein the speed of operation of said correlators is a fractional part of the speed of operation of said high speed PN code.

* * * * *